United States Patent
Rohanna et al.

(10) Patent No.: US 11,370,852 B2
(45) Date of Patent: Jun. 28, 2022

(54) MAKING LOW-SODIUM RESIN

(71) Applicants: DDP SPECIALTY ELECTRONIC MATERIALS US, INC., Collegeville, PA (US); DDP SPECIALTY ELECTRONIC MATERIALS US 8, LLC, Collegeville, PA (US)

(72) Inventors: John C. Rohanna, Royersford, PA (US); Marvin H. Tegen, Midland, MI (US); Alfred K. Schultz, Maple Glen, PA (US)

(73) Assignees: DDP SPECIALTY ELECTRONIC MATERIALS US, INC.; DDP SPECIALTY ELECTRONIC MATERIALS US 8, LLC

( * ) Notice: Subject to any disclaimer, the term of this patent is extended or adjusted under 35 U.S.C. 154(b) by 240 days.

(21) Appl. No.: 16/754,590

(22) PCT Filed: Oct. 8, 2018

(86) PCT No.: PCT/US2018/054794
§ 371 (c)(1),
(2) Date: Apr. 8, 2020

(87) PCT Pub. No.: WO2019/083712
PCT Pub. Date: May 2, 2019

(65) Prior Publication Data
US 2020/0354486 A1  Nov. 12, 2020

Related U.S. Application Data

(60) Provisional application No. 62/576,677, filed on Oct. 25, 2017.

(51) Int. Cl.
*C08F 6/00* (2006.01)
*C08J 3/03* (2006.01)

(52) U.S. Cl.
CPC ............... *C08F 6/008* (2013.01); *C08J 3/03* (2013.01); *C08J 2325/08* (2013.01)

(58) Field of Classification Search
CPC ........ C08F 12/08; C08F 12/26; C08F 220/06; C08F 220/10; C08F 212/08; C08F 8/30; C08F 8/32; C08F 6/008; C08F 257/02; C08J 5/20; C08J 2325/18; C08J 2325/08
See application file for complete search history.

(56) References Cited

U.S. PATENT DOCUMENTS

| | | | | |
|---|---|---|---|---|
| 2,591,573 A | * | 4/1952 | Mcburney | C08F 8/44 525/379 |
| 2,697,079 A | * | 12/1954 | D'Alelio | C08F 26/02 525/367 |
| 2,992,544 A | * | 7/1961 | Mcmaster | C08F 8/44 525/379 |
| 4,025,467 A | * | 5/1977 | Brock | B01J 47/016 525/366 |
| 4,419,245 A | * | 12/1983 | Barrett | C08F 257/02 526/201 |
| 4,785,020 A | * | 11/1988 | Boom | B01J 41/14 521/32 |

* cited by examiner

*Primary Examiner* — Christopher M Rodd
(74) *Attorney, Agent, or Firm* — Carl P. Hemenway; Kenneth Criminaldi

(57) ABSTRACT

Provided is method of treating a collection of resin beads (a) comprising the steps of (a) providing the collection of resin beads (a), wherein the resin beads (a) comprise one or more vinyl polymers having quaternary ammonium groups; wherein 90 mole % or more of the quaternary ammonium groups are each associated with a chloride anion; (b) bringing the collection of resin beads (a) into contact with an aqueous solution (b) comprising one or more dissolved $(M)_n X_q$ to form a mixture (b), (c) separating water and compounds dissolved in the water from the mixture (b), to form resin beads (c) and waste solution (bw); (d) bringing resin beads (c) into contact with an aqueous solution (c) comprising dissolved $(M3)(OH)_p$, to form a mixture (d).

8 Claims, 1 Drawing Sheet

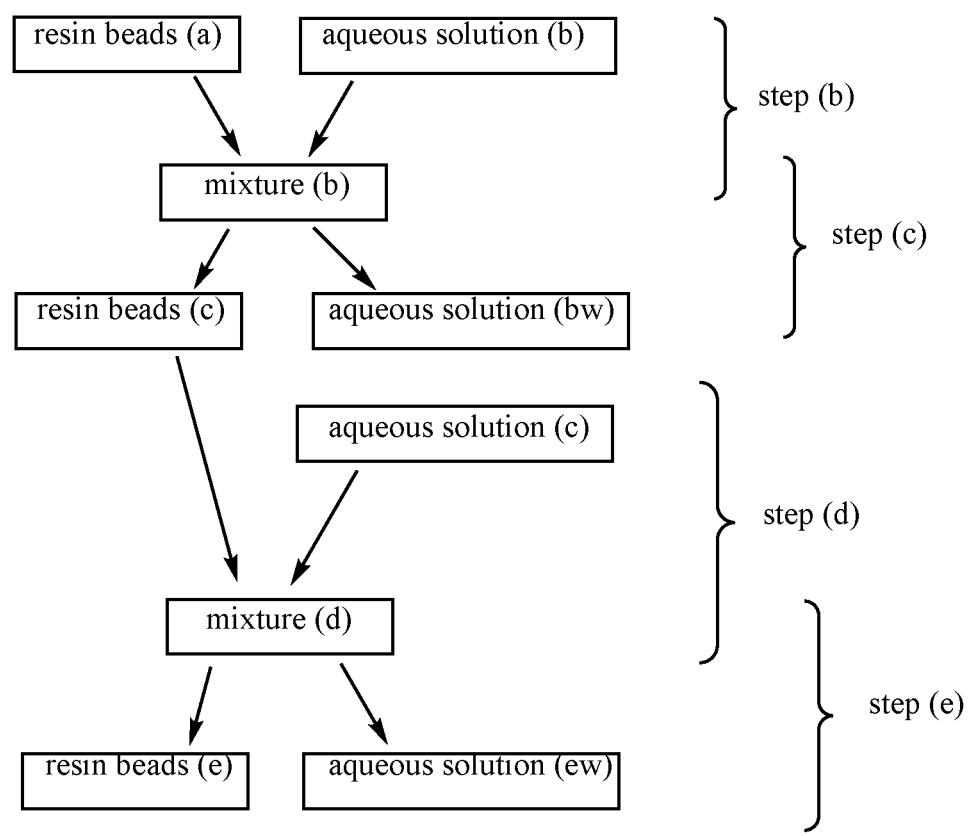

MAKING LOW-SODIUM RESIN

A useful class of products is resin beads that contain vinyl polymer that has quaternary ammonium groups. It is often desired to provide such resin beads in hydroxide form, i.e., a form in which 90 mole % or more of the quaternary ammonium groups are each associated with a hydroxide ion. However, in the course of developing the present invention, it has been observed that a collection of such resin beads in hydroxyl form that were made by previously-known methods normally contains more than 100 ppb of sodium, often more than 500 ppb, or even more than 5000 ppb, by weight. For some possible uses of the resin beads, such an amount of sodium is undesirably high. Therefore it is desired to provide a method of producing of collection of resin beads in which the sodium level is 100 ppb by weight or less.

In the usual previously-known process of making resin beads containing a vinyl polymer with quaternary ammonium groups, the process produces a resin in which the amount of chloride ion is 90 mole % or more of the quaternary ammonium groups. However, the resin having chloride counter ions is not desirable for many applications, and so the resin historically has been brought into contact with one or more aqueous solutions, one or more of which has historically been an aqueous solution of NaOH, in order to exchange $Cl^\ominus$ for $OH^\ominus$. For example, historically, the resin having chloride counter ion may have been, in a first step, contacted with an aqueous solution of $NaHCO_3$ or $Na_2CO_3$ and then, in a second step, contacted with an aqueous solution of NaOH (as described, for example, in U.S. Pat. No. 4,025,467). It is contemplated that contact with the aqueous solution of $NaHCO_3$ or $Na_2CO_3$ will mainly exchange $Cl^\ominus$ for $(HCO_3)^\ominus$ or for $CO_3^{2\ominus}$, but will also sometimes exchange $Cl^\ominus$ for the anion $(CO_3Na)^\ominus$. Thus, even though the main process is exchange of anions, the resin is thought to acquire some sodium atoms.

For another example, the resin having chloride counter ion may be contacted directly with an aqueous solution of NaOH. It is contemplated that the aqueous solution of NaOH contains some carbonate ion, $CO_3^{2\ominus}$, and/or some of the anion $(CO_3Na)^\ominus$. It is contemplated that the $CO_3^{2\ominus}$ and/or $(CO_3Na)^\ominus$ is present because of neutralization of dissolved $CO_2$ that occurs during storage. It is further contemplated that, while contact between the resin having chloride counter ion and the aqueous solution of NaOH will cause the vast majority of $Cl^\ominus$ counterions to be replaced with $OH^\ominus$, a few of the $Cl^\ominus$ counterions will be replaced with $(CO_3Na)^\ominus$. Thus, in this example, it is also the case that, while the main process is exchange of anions, the resin is thought to acquire some sodium atoms.

EP 0 183 158 describes process for converting strong base anion exchange resin from chloride form to hydroxide form. One process described by EP 0 183 158 is a two step process. In a first step, the resin is contacted with a first solution that contains carbonate, bicarbonate, or mixture thereof. In a second step, the resin is contacted with a second solution that contains hydroxide. The only cation disclosed by EP 0 183 158 for use in either the first solution or the second solution is sodium. It is desired to provide a process for converting strong base anion exchange resin from chloride form to hydroxide form that produces a resin in chloride form that has very low sodium content.

The following is a statement of the invention.

A first aspect of the present invention is a method of treating a collection of resin beads (a) comprising the steps of (a) providing the collection of resin beads (a),
wherein the resin beads (a) comprise one or more vinyl polymers having quaternary ammonium groups;
wherein 90 mole % or more of the quaternary ammonium groups are each associated with a chloride anion;

(b) bringing the collection of resin beads (a) into contact with an aqueous solution (b) comprising one or more dissolved $(M)_n X_p$ to form a mixture (b),
wherein M is a cation of charge (+i) that contains no metal atom, alkali metal atom, or alkaline earth atom;
wherein X is an anion of charge (−j), wherein X is selected from the group consisting of carbonate, bicarbonate, dihydrogen phosphate, formate, acetate, and aminoacetate;
and wherein (n·i)=(p·j).

(c) separating water and compounds dissolved in the water from the mixture (b), to form resin beads (c) and waste solution (bw);

(d) bringing resin beads (c) into contact with an aqueous solution (c) comprising dissolved $(M3)(OH)_p$, to form a mixture (d);
wherein M3 is a cation of charge (+k) that contains no metal atom, alkali metal atom, or alkaline earth atom;
and wherein p=k.

The following is a brief description of the drawing.

The Figure shows a flow diagram illustrating the steps of one embodiment of the present invention.

The following is a detailed description of the invention.

As used herein, the following terms have the designated definitions, unless the context clearly indicates otherwise.

"Resin" as used herein is a synonym for "polymer." A "polymer," as used herein is a relatively large molecule made up of the reaction products of smaller chemical repeat units. Polymers may have structures that are linear, branched, star shaped, looped, hyperbranched, crosslinked, or a combination thereof polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof. Polymers have weight-average molecular weight of 2,000 or more.

Molecules that can react with each other to form the repeat units of a polymer are known herein as "monomers." The repeat units so formed are known herein as "polymerized units" of the monomer.

Vinyl monomers have a non-aromatic carbon-carbon double bond that is capable of participating in a free-radical polymerization process. Vinyl monomers have molecular weight of less than 2,000. Vinyl monomers include, for example, styrene, substituted styrenes, dienes, ethylene, ethylene derivatives, and mixtures thereof. Ethylene derivatives include, for example, unsubstituted and substituted versions of the following: vinyl acetate and acrylic monomers. "Substituted" means having at least one attached chemical group such as, for example, alkyl group, alkenyl group, vinyl group, hydroxyl group, alkoxy group, hydroxyalkyl group, carboxylic acid group, sulfonic acid group, quaternary ammonium group, other functional groups, and combinations thereof.

As used herein, acrylic monomers include acrylic acid, methacrylic acid, esters thereof, amides thereof, acrylonitrile, and methacrylonitrile. Esters of acrylic acid and methacrylic acid include alkyl esters in which the alkyl group is substituted or unsubstituted. Amides of acrylic acid and methacrylic acid have the structure (III)

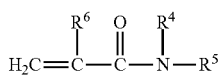

(III)

where $R^6$ is hydrogen or methyl; where each of $R^4$ and $R^5$ is an organic group; where the N in structure (III) is bonded to a carbon atom in each of $R^4$ and $R^5$.

As used herein, vinyl aromatic monomers are vinyl monomers that contain one or more aromatic ring.

Vinyl monomers are considered to form polymers through a process of vinyl polymerization, in which the carbon-carbon double bonds react with each other to form a polymer chain.

A polymer in which 90% or more of the polymerized units, by weight based on the weight of the polymer, are polymerized units of one or more vinyl monomers is a vinyl polymer. A vinyl aromatic polymer is a polymer in which 50% or more of the polymerized units, by weight based on the weight of the polymer, are polymerized units of one or more vinyl aromatic monomer. A vinyl aromatic polymer that has been subjected to one or more chemical reactions to attach quaternary ammonium groups to the vinyl aromatic polymer is still considered herein to be a vinyl aromatic polymer. An acrylic polymer is a polymer in which 50% or more of the polymerized units, by weight based on the weight of the polymer, are polymerized units of one or more acrylic monomer. An acrylic polymer that has been subjected to one or more chemical reactions to attach quaternary ammonium groups to the acrylic polymer is still considered herein to be an acrylic polymer.

A resin is considered herein to be crosslinked if the polymer chain has sufficient branch points to render the polymer not soluble in any solvent. When it is said herein that a polymer is not soluble in a solvent, it means that less than 0.1 gram of the resin will dissolve in 100 grams of the solvent at 25° C.

An aqueous environment is a liquid that contains 75% or more water by weight based on the weight of the liquid.

An anion exchange resin is a polymer that has cationic groups covalently bound to the resin. Cationic groups on anion exchange resins relevant to the present invention are quaternary ammonium groups.

A quaternary ammonium group has the structure (I):

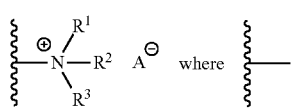

(I)

denotes the connection between the quaternary ammonium group and some other organic group, and $A^\ominus$ is an anion. Each of $R^2$, and $R^3$ is an organic group that contains at least one carbon atom and at least one hydrogen atom. The nitrogen atom in structure (I) is bonded to a carbon atom in each of $R^1$, $R^2$, and $R^3$.

A collection of resin beads is characterized by the diameters of the beads. If a bead is not spherical, the diameter of the bead is considered to be the diameter of a particle having the same volume as the bead. A collection of resin beads is characterized herein by the volume-average diameter of the collection. Volume-average diameter is measured by passing the collection of beads through a series of wire mesh screens, where the opening size of each screen is known, and each screen has smaller openings than the previous screen. The volume of beads retained on each screen provides a distribution of diameters, from which the volume-average diameter is calculated.

The amount of sodium present in a collection of resin beads is measured by inductively coupled plasma mass spectrometry (ICP-MS). The abbreviation "ppb" is parts per billion, and "ppm" is parts per million. Unless stated otherwise, ppb and ppm are reported herein by weight.

The resin beads (a) of the present invention comprise one or more vinyl polymers. Preferred are vinyl aromatic polymers and acrylic polymers; more preferred are vinyl aromatic polymers.

Among vinyl aromatic polymers, preferred are those that comprise polymerized units of styrene, substituted styrenes, divinylbenzene, and combinations thereof. Preferably, the total amount of polymerized units of styrene, substituted styrenes, and divinylbenzene is, by weight based on the weight of the vinyl aromatic polymer, 75% or more; more preferably 85% or more; more preferably 95% or more; more preferably 99% or more.

The vinyl polymer used in the present invention has quaternary ammonium groups.

When the vinyl polymer is a vinyl aromatic polymer, preferably, quaternary ammonium groups are bonded to carbon atoms that are adjacent to an aromatic ring. Among vinyl aromatic polymers, preferably, the vinyl aromatic polymer has one or more polymerized units of structure (II):

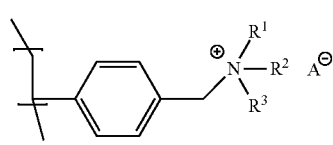

(II)

Where the polymerized unit is the structure between the brackets, and the lines extending through the brackets denote bonds between the polymerized unit and the adjacent polymerized units. In structure (II), the quaternary ammonium-containing group is shown in the para position. Also suitable are structures (II) in which quaternary ammonium-containing groups are attached in the ortho or meta positions, and combinations thereof. $R^1$, $R^2$, $R^3$, and $A^\ominus$ are defined as in structure (I). Preferably, each of $R^1$, $R^2$, and $R^3$ is a substituted or unsubstituted alkyl group having 6 carbon atoms or fewer; more preferably 4 carbon atoms or fewer; more preferably 2 carbon atoms or fewer. Preferably, each of $R^1$, $R^2$, and $R^3$ is an unsubstituted alkyl group or a hydroxyl-substituted alkyl group having no substituents other than the hydroxyl group. Preferably, W and $R^2$ are the same as each other; more preferably, W and $R^2$ are identical unsubstituted alkyl groups. In one preferred embodiment, $R^1$, $R^2$, and $R^3$ are the same as each other. In another preferred embodiment, W and $R^2$ are identical unsubstituted alkyl groups, and $R^3$ is an akyl group with one substituent, which is a hydroxyl group.

Among acrylic polymers, preferred are those that comprise polymerized units of substituted or unsubstituted alkyl esters of acrylic acid, substituted or unsubstituted alkyl esters of methacrylic acid, unsubstituted or N-substituted amides of acrylic acid, unsubstituted or N-substituted amides of methacrylic acid, and combinations thereof. Among acrylic polymers, more preferred are those that comprise polymerized units of substituted or unsubstituted alkyl esters of acrylic acid, unsubstituted or N-substituted amides of acrylic acid, and combinations thereof. Among acrylic polymers, preferably, the total amount of polymerized units of acrylic monomers is, by weight based on the weight of the acrylic polymer, 75% or more; more preferably 85% or more; more preferably 95% or more; more preferably 99% or more.

When the vinyl polymer is an acrylic polymer, preferably the acrylic polymer has one or more polymerized units of structure (IV):

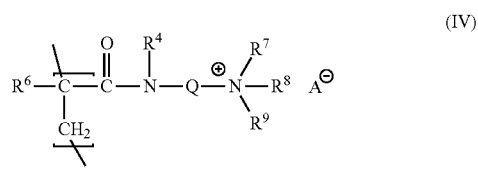

where $R^6$ is hydrogen or methyl, preferably hydrogen; where $R^4$ is hydrogen or methyl or ethyl, preferably hydrogen; where Q is an unsubstituted alkyl group having 1 to 8 carbon atoms, preferably ethyl or n-propyl; where each of $R^7$, $R^8$, and $R^9$ is an organic group containing one or more carbon atom and one or more hydrogen atom; where a carbon atom within each of $R^7$, $R^8$, and $R^9$ is bonded to the ammonium nitrogen atom in structure (IV). Preferred organic groups for $R^7$, $R^8$, and $R^9$ are unsubstituted alkyl groups having 1 to 8 carbon atoms and hydroxyalkyl groups having 1 to 8 carbon atoms; more preferred are unsubstituted alkyl groups having 1 to 2 carbon atoms and hydroxyalkyl groups having 1 to 2 carbon atoms. Two preferred embodiments for structure (IV) are as follows: (1) each of $R^7$, $R^8$, and $R^9$ is methyl; and (2) $R^7$ and $R^8$ are methyl, and $R^9$ is 2-hydroxyethyl.

Preferably, the collection of resin beads (a) having quaternary ammonium groups is useful as an anion exchange resin.

Vinyl polymer having quaternary ammonium groups may be made by any method. In a preferred method, a first step is performed in which a preliminary vinyl polymer is made by free-radical vinyl polymerization of monomers that include vinyl monomers. Then, this preliminary vinyl polymer is preferably subjected to one or more chemical reactions that result in the attachment of quaternary ammonium groups to the vinyl polymer.

When the vinyl polymer is a vinyl aromatic polymer, the preferred vinyl aromatic monomers for making the preliminary vinyl aromatic polymer are styrene and divinyl benzene. Preferably, the sum of the amount of polymerized units of styrene plus the amount of polymerized units of divinylbenzene, by weight based on the weight of the preliminary vinyl aromatic polymer, is 50% or more; more preferably 75% or more; more preferably 85% or more; more preferably 95% or more. Then, this preliminary vinyl aromatic polymer is preferably subjected to one or more chemical reactions that result in the attachment of quaternary ammonium groups to the polymer, preferably by forming structures as shown in structure (II).

When the vinyl polymer is acrylic polymer, the preferred acrylic monomers are unsubstituted alkyl esters of acrylic or methacrylic acid in which the alkyl group has 1 to 8 carbon atoms; more preferably 1 to 4 carbon atoms; more preferably 1 or 2 carbon atoms; more preferably 1 carbon atom. Alkyl esters of acrylic acid are preferred. Preferably, the sum of the amount of polymerized units of unsubstituted alkyl esters of acrylic or methacrylic acid, by weight based on the weight of the preliminary acrylic polymer, is 50% or more; more preferably 75% or more; more preferably 85% or more; more preferably 95% or more. Then, this preliminary acrylic polymer is preferably subjected to one or more chemical reactions that result in the attachment of quaternary ammonium groups to the polymer, preferably by forming structures as shown in structure (IV).

Preferably the amount of vinyl polymer in the resin beads (a) is, by weight based on the weight of the resin beads, 50% or more; more preferably 75% or more; more preferably 85% or more; more preferably 95% or more; more preferably 99% or more.

Preferably, the collection of resin beads (a) of the present invention has volume-average diameter of 300 micrometer or more; more preferably 500 micrometer or more. Preferably, the collection of resin beads (a) of the present invention has volume-average diameter of 1500 micrometer or less; more preferably 1200 micrometer or less; more preferably 1000 micrometers or less.

Prior to step (b) of the method of the present invention, among the quaternary ammonium groups bonded to the vinyl polymer of resin beads (a), the amount that have $A^\ominus$ that is chloride is 90 mole % or more; preferably 95% or more; more preferably 99 mole % or more.

The method of the present invention involves a step (b) of bringing the collection of resin beads (a) into contact with an aqueous solution (b). Aqueous solution (b) comprises one or more dissolved $M_nX_q$. M is a cation of charge (+i) that contains no metal atom, no alkali metal atom, and no alkaline earth atom. X is an ion of charge (−j) that is selected from the group consisting of carbonate, bicarbonate, dihydrogen phosphate, formate, acetate, and aminoacetate. The values i, j, n, and q are positive integers. The values of n and q meet the criterion n·i=q·j.

Preferably M is a trialkyl ammonium cation or ammonium cation; more preferably M is ammonium cation. When M is a trialkyl ammonium cation, preferred alkyl groups have 6 or fewer carbon atoms; more preferably 4 or fewer; more preferably 2 or fewer. Preferably X is carbonate or bicarbonate.

Optionally a mixture of two or more different compounds $M_nX_q$ is used. When such a mixture is used, preferably every M is trialkyl ammonium cation or ammonia cation; more preferably every M is ammonia cation.

While the present invention is not limited by any theory, the following discussion may aid in understanding some of the motivations for the present invention. One goal of the method of the present invention is the conversion of chloride-form resins to hydroxide form. That is, initially, the quaternary ammonium groups on the resin are mostly associated with chloride ions, and it is desired to replace those chloride ions with hydroxide ions. It is possible to make this conversion directly by treating the chloride-form resin with a solution of a hydroxide salt. However, such direct treatment is often inefficient, because many resins that contain quaternary ammonium groups have a greater affinity for chloride ions than for hydroxide ions. This affinity is usually expressed by saying that the "selectivity" of chloride ions is "higher" than the "selectivity" of hydroxide ions (see, for example, Wheaton and Bauman, "Properties of Strongly Basic Anion Exchange Resins," Industrial and Engineering Chemistry, volume 43, page 1088, 1951; and EP 0 183 158). It is expected that a direct conversion would be inefficient because either a high concentration of hydroxide would be required in the treatment solution or a large volume of treatment solution would be required, or both. It is expected that a more efficient method would be to identify one or more "intermediate" anions that have selectivity in between those of chloride and hydroxide. Then treatment with a solution of an intermediate anion could remove the chloride efficiently, and then, in a second step, treatment with a hydroxide solution could remove the intermediate anions. It is predicted that the anions specified herein as anion "A" function as intermediate anions.

$M_nX_q$ is referred to here as "non-metal salt." The total concentration of dissolved non-metal salts in the aqueous solution (b) is preferably 0.02 N or higher; more preferably 0.05 N or higher; more preferably 0.1 N or higher. The total concentration of non-metal salts in the aqueous solution (b) is preferably 2 N or lower; more preferably 1 N or lower; more preferably 0.5 N or lower. In the method of the present invention, after step (b), then step (c) is performed. In step (c), resin beads (now labeled resin beads (c)) are separated from some of the water and dissolved substances (now labeled aqueous solution (bw)).

Steps (b) and (c) may be performed by any of a wide variety of methods. Two preferred types of methods are batch methods and flow methods. More preferred are flow methods. For any method, it is useful to characterize the method by the "C/R ratio", which is the ratio of the total mass (in grams) of non-metal salts to the volume (in liters) of the collection of resin beads. The C/R ratio is reported as a single number, with units of total grams of (b)carbonate salts per liter of resin beads.

In batch methods, an amount of resin beads (a) and an amount of aqueous solution (b) of are placed into a container to form a mixture (b). Normally, some mechanical agitation is applied to this mixture (b). Then, mixture (b) is considered to contain a collection of resin beads (b) and to contain an aqueous solution that contains one or more dissolved species, and one or more of those dissolved species contains the chloride that had been removed from the resin beads (b). The chloride in the aqueous solution may be in any form, including for example, dissolved chloride anions, chloride as part of a complex, other forms, or combinations thereof.

In a batch method, after the formation and agitation of mixture (b), some or all of the resulting aqueous solution is separated from mixture (b), and the separated aqueous solution is labeled aqueous solution (bw). Any method of separation may be used, including, for example, decanting, filtering, centrifuging, other separation methods, and combinations thereof. Preferably, the amount of aqueous solution (bw) separated from mixture (b) is, by weight based on the original weight of the aqueous solution (b) added to mixture (b), 50% or more; more preferably 75% or more. After the separation is accomplished, the collection of resin beads is now labeled resin beads (c). It is expected that some water, possibly included one or more dissolved substances, will continue to remain attached to the resin beads (c) after the separation, and such attached water is considered part of the collection of resin beads (c).

For a batch method, the C/R ratio is found by dividing the total grams of non-metal salts present in the amount of aqueous solution (b) that was placed in the container by the volume of the collection of resin beads (a) that was placed in the container. The volume of the collection of resin beads (a) is measured prior to forming mixture (b).

In flow methods, the resin beads (a) are placed in a container, such as, for example, a chromatography column, that keeps the resin beads (a) in place while an aqueous solution is introduced into the container. The aqueous solution passes through the collection of resin beads (a) and then exits the container through an outlet, while the container keeps the resin beads (a) within the container. While aqueous solution (b) is flowing through the container, a portion of aqueous solution (b) resides within the container in contact with resin beads (a), and the aqueous solution (b) inside the container and the resin beads (a) within the container together are considered to form a mixture (b). Aqueous solution that exits the container after contact with the resin beads is considered to be "removed" from mixture (b) and is labeled aqueous solution (bw). After the desired amount of aqueous solution (b) has flowed through the container, the flow is stopped, and the resin beads remaining in the container are labeled resin beads (c). It is contemplated that after flow of aqueous solution (b) has been stopped and aqueous solution (b) has been allowed to drain from the container by gravity, some water, possibly containing one or more dissolved compounds, will continue to be attached to the resin beads (c) in the container. Such water is considered to be part of the collection of resin beads (c).

For a flow method, the C/R ratio is found by dividing the total grams of non-metal salts present in the total amount of aqueous solution that was introduced into the container by the volume of the collection of resin beads (a) that was placed in the container. The volume of the collection of resin beads (a) is measured prior to placement in the container.

Preferably, the C/R ratio is, in total grams of non-metal salts per liter of resin beads (a), 0.5 or higher; more preferably 1 or higher; more preferably 2 or higher. Preferably, the C/R ratio is, in grams of non-metal salts per liter of resin beads (a), 20 or lower; more preferably 10 or lower.

After step (c) is performed, then step (d) is performed. In step (d), the collection of resin beads (c) is brought into contact with aqueous solution (c) to form mixture (d). Preferably, after step (d), then step (e) is performed, in which resin beads (e) are separated from aqueous solution (ew). Steps (d) and (e) are suitably performed by any of a wide variety of methods. Preferred methods are batch methods and flow methods as described above. More preferred are flow methods.

Aqueous solution (c) contains $(M3)(OH)_p$ dissolved in water. M3 is a cation of charge (+k) that contains no metal atom, no alkali metal atom, and no alkaline earth atom. The values p and k are positive integers, and p=k. M3 is preferably trialkylammonium or ammonium or a mixture thereof; more preferably ammonium.

$(M3)(OH)_p$ is referred to herein as "non-metal hydroxide." Preferably, the concentration of non-metal hydroxide in aqueous solution (c) is 0.02 N or higher; more preferably 0.05 N or higher; more preferably 0.1 N or higher. Preferably, the concentration of non-metal hydroxide in aqueous solution (c) is 2 N or lower; more preferably 1 N or lower; more preferably 0.5 N or lower.

For steps (d) and (e), the H/R ratio is calculated as described above for the C/R ratio except that the H/R ratio for steps (d) and (e) is the quotient found by dividing the grams of non-metal hydroxide used in steps (d) and (e) by the volume of the collection of resin beads (c). Preferably, the H/R ratio is, in total grams of non-metal hydroxide per liter of resin beads (a), 0.5 or higher; more preferably 1 or higher; more preferably 2 or higher. Preferably, the H/R ratio is, in grams of non-metal hydroxide per liter of resin beads (a), 20 or lower; more preferably 10 or lower.

The amount of sodium in the collection of resin beads of the present invention refers to the amount of sodium in any form, including, for example, neutral elemental sodium, cationic sodium, sodium in a complex, other forms, and combinations thereof. After steps (d) and (e), the amount of sodium, by weight based on the weight of the collection of resin beads, is preferably either zero or, if not zero, is NaMAX or less, where NaMAX is preferably 500 ppb; more preferably 200 ppb; more preferably 100 ppb; more preferably 75 ppb; more preferably 50 ppb. Most preferably, no sodium is present.

Preferably, after step (e), the resin beads (e) are in hydroxide form. That is, the amount of hydroxide ion present in the collection of resin beads (e) is, by mole % based on the moles of quaternary ammonium groups, 90% or more; more preferably 95% or more; more preferably 99% or more.

In performing the method of the present invention, it is envisioned that additional steps may be taken in addition to those described above. For example, at any point, a collection of resin beads is optionally washed by being brought into contact with water and then separated from the water. Such a water wash is optionally performed, for example, at one or more of the following times: prior to step (b), between steps (c) and (d), and after step (e). Preferably, the collection of resin beads is not brought into contact with any aqueous solution that contains sodium.

An embodiment of the present invention is illustrated in the Figure. In step (b), the collection of resin beads (a) (resin having chloride-form quaternary groups) are brought into contact with aqueous solution (b) (non-metal salts) to form mixture (b). Then, in step (c), a collection of resin beads (c) is separated from aqueous solution (bw). Then, in step (d), the collection of resin beads (c) is brought into contact with aqueous solution (c) (no-metal hydroxide) to form mixture (d). Then, in step (e), a collection of resin beads (e) is separated from aqueous solution (ew).

The following are examples of the present invention.

The resin beads used in the following examples are styrene/divinyl benzene copolymers that have attached quaternary ammonium groups. Volume-average bead diameter was between 300 and 1500 micrometer.

Preparative Example 1

Using known methods, styrene/divinyl benzene copolymer beads were prepared by suspension polymerization. The divinyl benzene was 63% pure by weight, with approximately 37% by weight ethyl vinyl benzene. The beads were reacted with chloromethyl methyl ether in the presence of $ZnCl_2$ catalyst to attach chloromethyl groups to the aromatic rings. The product was reacted with trimethyl amine to convert the chlorine atom of the chloromethyl group to a quaternary ammonium chloride, with the nitrogen atom bonded to the carbon atom of the chloromethyl group, creating resin (a).

The beads of resin (a) were treated by contact with an aqueous solution of ammonium carbonate, followed by treatment by contact with an aqueous solution of ammonium hydroxide as follows:

To a 3 L round-bottomed flask was added a 1.6 L of resin (a) and 1 L of 0.2N ammonium carbonate to form a mixture. This mixture was allowed to stir for 1 hour, after which, the resin beads (c) were separated from the aqueous solution by siphoning away of the aqueous mixture. To the resulting resin beads was added 1 L of 0.2N ammonium hydroxide solution. This mixture was allowed to stir for 1 hour after which, the aqueous solution was siphoned away, and the resulting resin was washed 3 times with pure water to give resin (e), the product of Example 1.

Comparative Preparative Example C2

Beads (herein labeled "resin R1"), were prepared using the procedure of Preparative Example 1 for making resin (a), except that the catalyst for the chloromethylation reaction was $FeCl_3$. The beads of resin R1 were washed by contact with an aqueous solution of sodium bicarbonate, followed by washing by contact with an aqueous solution of sodium hydroxide as follows.

To a 3 L round-bottomed flask was added a 1.6 L of resin R1 and 1 L of 0.2N sodium carbonate to form a mixture. This mixture was allowed to stir for 1 hr, after which, the resin beads were separated from the aqueous solution by siphoning away of the aqueous mixture. To the resulting resin beads was added 1 L of 0.2N sodium hydroxide solution. This mixture was allowed to stir for 1 hour after which, the aqueous solution was siphoned away, and the resulting resin was washed 3× with pure water to give Comparative Resin C2.

Example 3: Na Content

The sodium content of the resulting beads from Example 1 and Comparative Example C2 were measured as follows. An aliquot of resin was digested via treatment with sulfuric acid in a microwave oven. The mixture was heated until a homogeneous solution was formed. An aliquot of this homogeneous solution was analyzed using a Agilent™ 8000-series ICP-MS to give the following:

| | Sodium Content |
|---|---|
| Example 1 | 24 ppb |
| Comparative Example C2 | 203 ppb |

Example 1, which was treated with ammonium salts, had far less sodium than Comparative C2, which was treated with sodium salts.

The invention claimed is:

1. A method of treating a collection of resin beads (a) comprising the steps of
   (a) providing the collection of resin beads (a),
      wherein the resin beads (a) comprise one or more vinyl polymers having quaternary ammonium groups;
      wherein 90 mole % or more of the quaternary ammonium groups are each associated with a chloride anion;
   (b) bringing the collection of resin beads (a) into contact with an aqueous solution (b) comprising one or more dissolved $(M)_n X_p$ to form a mixture (b),
      wherein M is a cation of charge (+i) that contains no metal atom, alkali metal atom, or alkaline earth atom;
      wherein X is an anion of charge (−j), wherein X is selected from the group consisting of carbonate, bicarbonate, dihydrogen phosphate, formate, acetate, and aminoacetate;
      and wherein (n·i)=(p·j)
   (c) separating water and compounds dissolved in the water from the mixture (b), to form resin beads (c) and waste solution (bw);
   (d) bringing resin beads (c) into contact with an aqueous solution (c) comprising dissolved $(M3)(OH)_p$, to form a mixture (d)
      wherein M3 is a cation of charge (+k) that contains no metal atom, alkali metal atom, or alkaline earth atom;
      and wherein p=k.

2. The method of claim 1, comprising the additional step (e) of separating water and compounds dissolved in the water from the mixture (d), to form resin beads (e) and waste solution (ew).

3. The method of claim 2, wherein the one or more vinyl polymers comprise one or more vinyl aromatic polymers.

4. The method of claim 3, wherein the one or more vinyl aromatic polymers comprise polymerized units of structure (II)

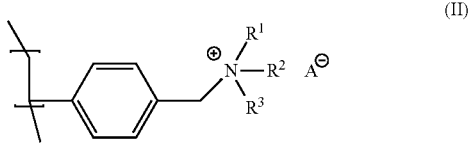

wherein the two substituents on the aromatic ring may be in the ortho, meta, or para positions; wherein $A^\ominus$ is an anion; wherein each of $R^1$, $R^2$, and $R^3$ is an organic group that contains at least one carbon atom and at least one hydrogen atom; and wherein the nitrogen atom in structure (II) is bonded to a carbon atom in each of $R^1$, $R^2$, and $R^3$.

5. The method of claim 2, wherein, after step (e), the sodium content of resin (e) is 100 ppb or less, by weight based on the total weight of resin (e).

6. The method of claim 1, wherein M is ammonium, trialkyl ammonium, or a mixture thereof.

7. The method of claim 1, wherein M is ammonium.

8. The method of claim 1, wherein the one or more compounds $M_nX_q$ comprise ammonium carbonate and ammonium bicarbonate.

* * * * *